July 23, 1968  L. J. LIEF  3,393,569

GYROSCOPE

Filed May 14, 1965　　　　　　　　　　　　　　　　　6 Sheets-Sheet 1

INVENTOR.
LAWRENCE J. LIEF
BY
Davis, Hoxie, Faithfull + Hapgood
ATTORNEYS

July 23, 1968  L. J. LIEF  3,393,569

GYROSCOPE

Filed May 14, 1965  6 Sheets-Sheet 2

INVENTOR.
LAWRENCE J. LIEF
BY
Davis, Hoxie, Faithfull & Hapgood
ATTORNEYS

July 23, 1968  L. J. LIEF  3,393,569
GYROSCOPE

Filed May 14, 1965  6 Sheets-Sheet 3

INVENTOR.
LAWRENCE J. LIEF
BY
Davis, Hoxie, Faithfull & Hapgood
ATTORNEYS

INVENTOR.
LAWRENCE J. LIEF
BY
Davis, Hoxie, Faithfull & Hapgood
ATTORNEYS.

INVENTOR.
LAWRENCE J. LIEF

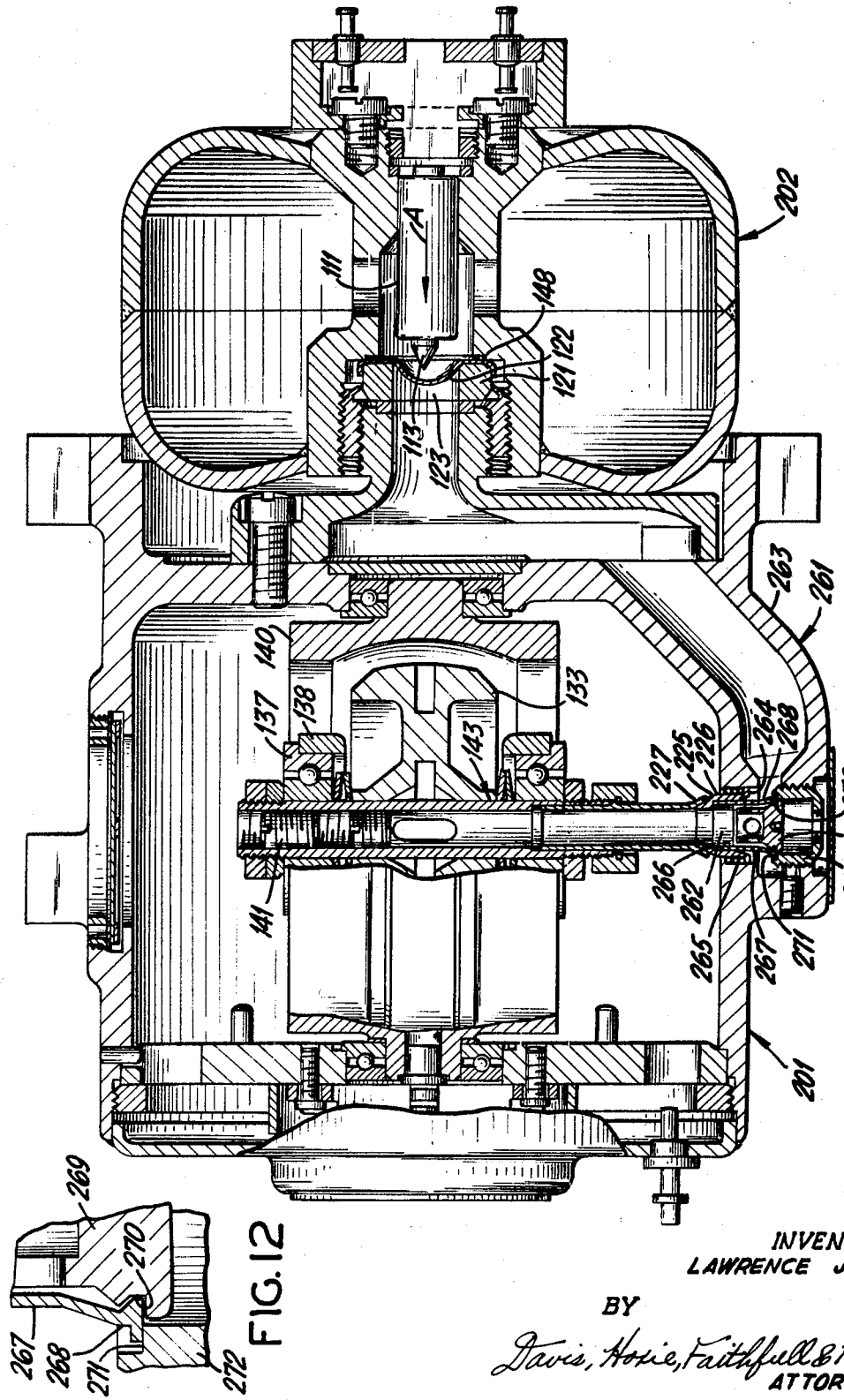

United States Patent Office 3,393,569
Patented July 23, 1968

3,393,569
GYROSCOPE
Lawrence J. Lief, Irvington, N.Y., assignor to The United States Time Corporation, Waterbury, Conn., a corporation of Connecticut
Filed May 14, 1965, Ser. No. 466,493
3 Claims. (Cl. 74—5.7)

ABSTRACT OF THE DISCLOSURE

A gyroscope is constructed having a gas driven reaction rotor in one chamber and compressed gas in another chamber. A thin wall, between the two chambers, is punctured, on starting the gyroscope, by an electrically operated pyrotechnic propelled piston. Gas passes from the second chamber through the hollow shaft of the rotor and spins the rotor. A caging device holds the gimbal assembly against movement until the gas pressure in the two chambers attains a predetermined pressure. The caging device is a metal spring diaphragm or a spring-loaded bushing assembly which acts on the rotor shaft.

---

This invention relates in general to a gyroscope, and more particularly to a gyroscope activated from an integrally contained gas source.

An objective of the invention is to provide a gyroscope drive which has a high ratio of usable energy in relation to its volume and weight. The desirability of such a high ratio in gyroscopes is well known where the gyroscope is intended to be used in aircraft, such as jet planes and guided missiles. In those instances, weight and volume are critical factors. Compared to spring driven gyroscopes, long known in the gyroscope art, the gas drive of the present invention results in a rotor energy about 2.5 times as great for equivalent weight of spring driven gyroscopes, and a rotor energy 1.65 times as great for equivalent size of spring driven gyroscopes. The advantages of the present invention using a gas drive are thus quite evident as to size and weight.

Another objective of the present invention is to provide, in conjunction with the rotor of the gyroscope, an automatic uncaging means which is directly related in timing to the delivery of maximum potential energy to the rotor by the driving means, allowing full rotor speed to be quickly attained before automatic release of the caging means. In the case of guided missiles, gyroscope actuation must be fast and certain, and such automatic uncaging means provide a simple and relatively certain mechanical method of releasing the rotor at the proper time.

Another objective of the present invention is to provide a relatively inexpensive gyroscope capable of operating after shocks, which is accurate over a broad range of temperatures, utilizes a minimum of moving parts so that it is rugged and small, and is highly reliable in its operation.

In accordance with the present invention, a gyroscope is provided having two adjacent chambers, one chamber containing the rotor of the gryoscope and the other chamber containing a compressed inert gas. The two chambers have a blocked passageway between them which is opened upon electrical activation of a firing piston. The compressed gas in its appropriate chamber maintains tubular caging means in connection with the hollow shaft of the rotor at all times during which the pressure of the compressed gas in its appropriate chamber remains above a certain level. When the passageway is opened between the two chambers, the compressed gas will flow through the tubular caging means into the hollow shaft of the rotor and into a hollow cavity within the rotor so that the rotor starts to spin. When sufficient gas empties from its appropriate chamber, the tubular caging means releases from the rotor shaft and uncages the gyro. The rotor has at least one nozzle arranged at its circumference and connected to the internal rotor cavity, and the nozzle is directed tangentially to the circumference.

The present invention utilizes a rotor in which the gas is expelled under pressure from its circumference. This type of gyroscope is superior to those utilizing rotors having external buckets or cavities which is impelled by an external nozzle because (1) applicant's internally driven rotor can use a plurality of nozzles so that a greater quantity of gas may be expelled and a faster momentum obtained; (2) applicant's reaction type of rotor is self-correcting in the event its nozzle is not exactly aligned. The impeller type, however, may apply a torque to the gimbal if the nozzle is misaligned relative to the impeller and if the gimbal is uncaged before all the gas is exhausted; (3) the impeller type of rotor has a net force on the shaft bearings which requires larger bearings than with applicant's reactor type of rotor; (4) applicant's reactor type of rotor has the maximum angular momentum for a given weight and a given size wheel as material need not be cut away from the perimeter in order to form buckets or cavities.

Other objectives of the present invention will be apparent from the following description of a preferred embodiment taken in conjunction with the accompanying drawings, in which:

FIG. 11 is a sectional view similar to FIGS. 3 and 6 but of a third embodiment of the present invention; and FIG. 12 is an enlarged sectional view of one portion of the embodiment shown in FIG. 11.

Figure 1:
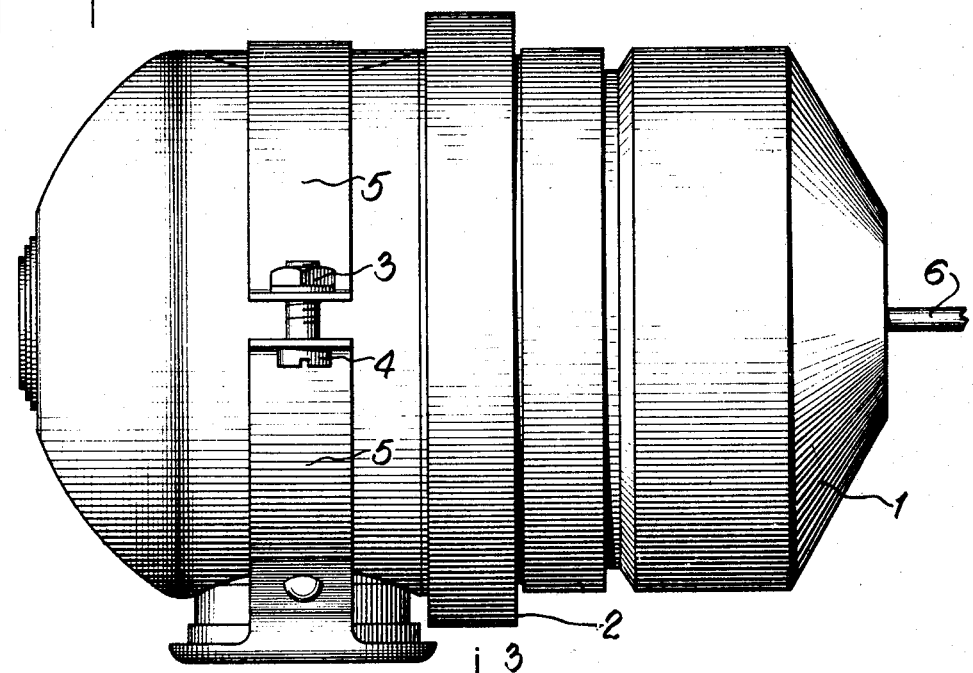
FIG. 1 is a side view showing the exterior configuration of the gyroscope.
Figure 2:
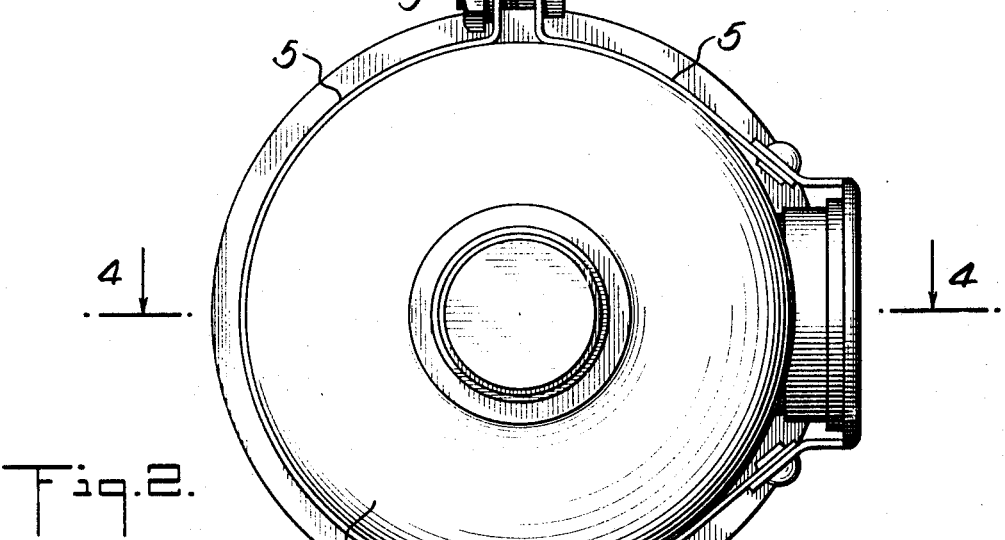
FIG. 2 is an end view showing its exterior configuration.
Figure 3:
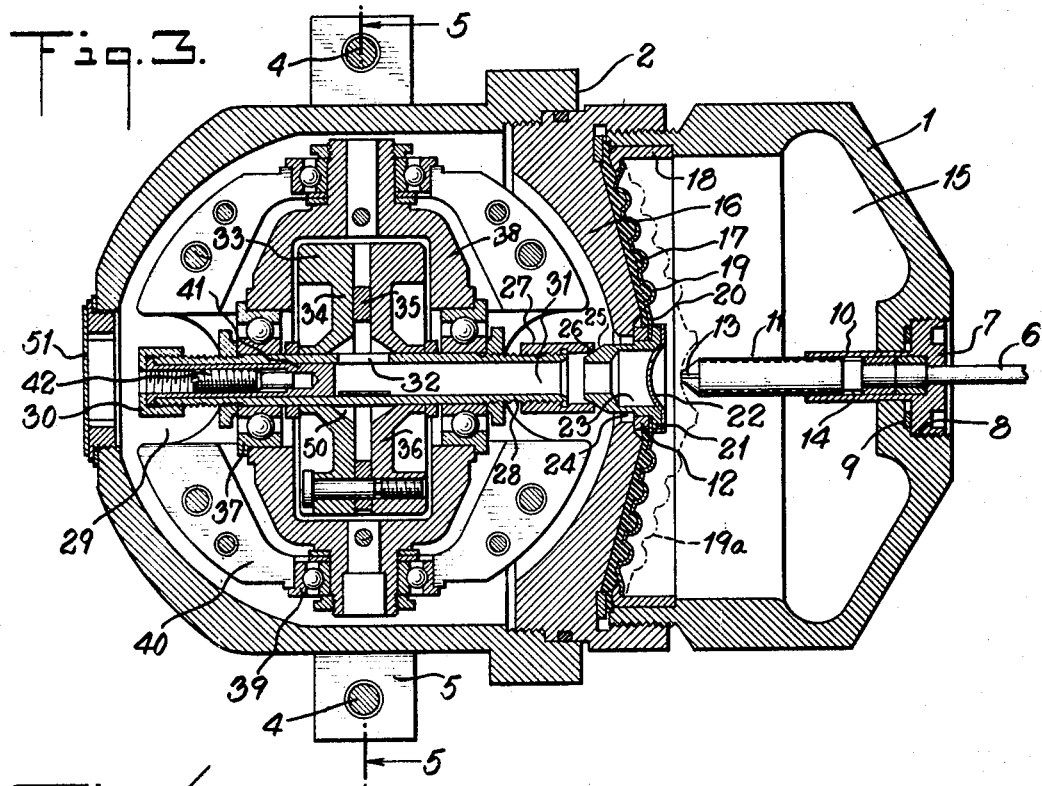
FIG. 3 is a sectional view taken along lines 3—3 of FIG. 2.

As shown in FIG. 1, the gyroscope includes a front case member 1 integrally attached to the main case member 2. The case member 2 is mounted by nuts 3 and bolts 4 in a retaining ring 5 which is adapted for the particular mounting of the gyroscope. A wire 6 leads into case portion 1. As seen in FIG. 3 the wire 6 is surrounded by a screw plug 7 which screws within cavity 8 of case member 1. A washer seal 9, within cavity 8, seals the plug 7 to the case 1. The wire is covered by tube 10 attached to plug 7. A hollow piston 11 is positioned so that its end is within tube 10. The piston 11 has on it a sharp point 13. Pyrotechnic material 14, which burns when heated or ignited, is packed in back of piston 11. The bare end of the conductor within wire 6 is embedded in the pyrotechnic material.

The case member 1 forms a large chamber 15 having wall 16 as its end wall. A rubber compound 17, which is carefully formed and measured, is adhered to wall 16 by glue. A flexible metal diaphragm 19 is placed on top of the rubber compound and attached to the flange member 18, so that the compound fills the raised portions of the diaphragm. The diaphragm is in the form of a thin spring metal disc, for example of 0.005 in thickness, having a central hole and circular upraised mound portions, i.e. corrugated. The inner circumference 20 of diaphragm 19 is attached to a disc holder 21 by holding ring 12, so that the disc holder moves upon movement of the diaphragm. The disc holder 21 removably fits within an opening 24 in wall 16. A thin rupturable metal disc 22 is secured on disc holder 21 and covers the opening 23 within the holder 21. This disc is preferably of stainless steel 0.0025 inch thick.

A beveled shoulder portion 25 of disc holder 21 fits against portion 26 of cylinder member (bushing) 27. The cylinder 27 is integral with tube 28 which extends almost the length of the internal chamber 29 of case member 2 and is terminated by the plug member 30. Tube 28 has a series of openings 32 at its center, to permit the flow of gas.

The gyroscope rotor 33, of high density tungsten alloy, is integrally attached to tube 28 and comprises a solid left member 34, a plurality of center members 35 which are specially shaped flat metal pieces attached by welding, brazing or other means to the other portions of the rotor, and a right-hand member 36. The tube 28 is mounted in rotor bearings 37 on its left and right sides. These rotor bearings are precision high-speed bearings, so that the rotor, when uncaged, is permitted to rotate at a high speed without vibration. The outer races of rotor bearing 37 are fixedly attached to inner gimbal 38 which also has attached to it the inner races of inner gimbal bearings 39. The outer gimbal 40 is attached to the outer races of inner gimbal bearings 39 and to the inner races of outer gimbal bearings 39a. A plug 41, preferably of aluminum, is inserted in tube 28 so that it fits firmly and a screw member 42 is screwed into the plug 41 in order to adjust the balance of the rotor.

Figure 4:
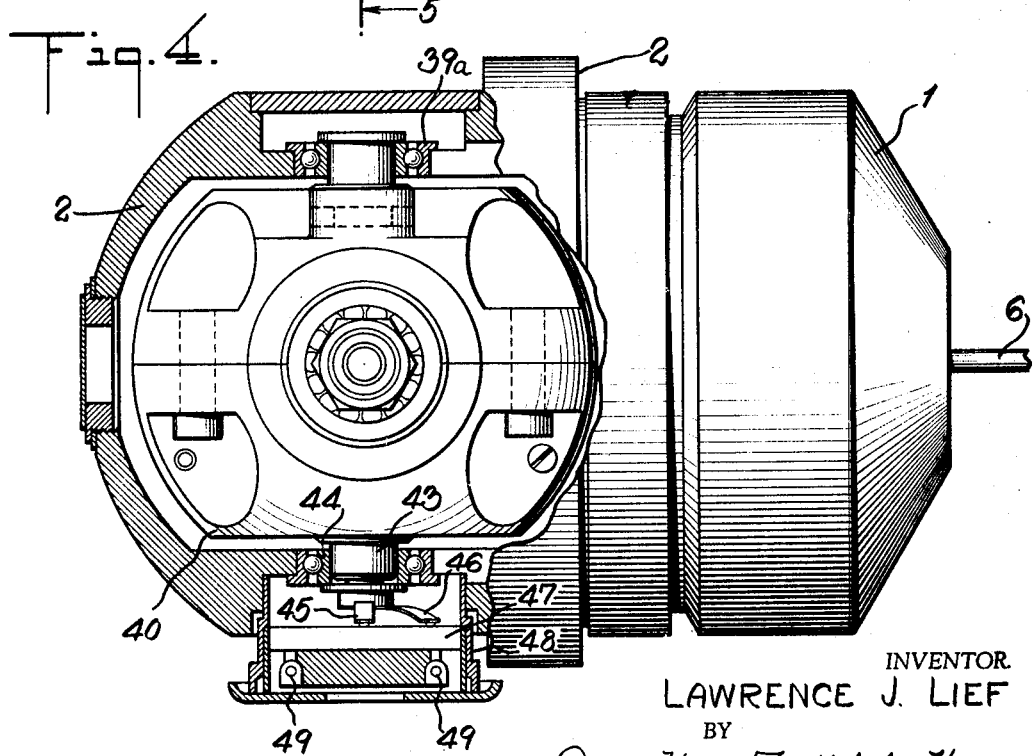
FIG. 4 is a view partly in section taken along lines 4—4 of FIG. 2.
Figure 5:
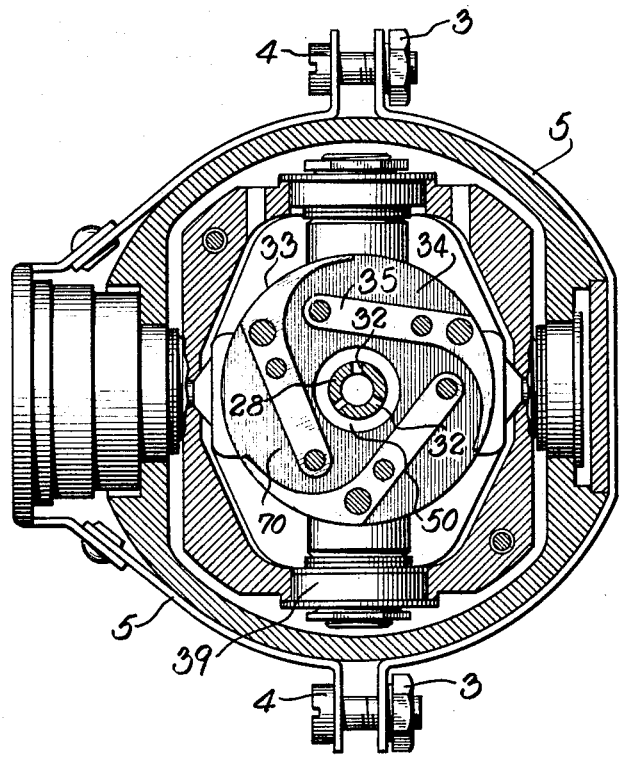
FIG. 5 is a sectional view taken along lines 5—5 of FIG. 3.

The electrical output mechanism of the gyroscope (see FIG. 4) includes a shaft 43 attached integrally with outer gimbal 40 and attached to the inner race of outer gimbal bearings 44. The outer races of the gimbal bearings 44 are attached to the case 2. The shaft 43 has a rotating portion 45 and a spring arm member 46. The spring arm rotates about a coil 47 mounted on coil block 48. Electrical contacts through posts 49 provide for electrical output relative to the rotational position of arm 46. In the alternative, other electrical output means, well known in the art, may be used.

In operation, the chamber 15 is filled at high pressure with an inert gas, preferably nitrogen, at 3,000 lbs. per square inch. The gyroscope is mounted in position, its mounting posts 49 connected to the electrical output and its wire 6 connected to the triggering electrical circuit. Upon receipt of an electrical pulse through wire 6, the pulse ignites the pyrotechnic material and shoots piston 11 out from tube 10. The point 13 of the piston ruptures disc 22 and immediately permits the flow of the high-pressure gas from chamber 15 through the openings 23 and 31 and into the interior of tube 28. Gas exits through the opening 32 in tube 28 and forms a high gas pressure in chamber 50 within the center of the rotor. The gas exits through nozzles 70 and is expelled as a high pressure jet of gas. The reaction effect of the jet pressure causes the rotor to start to spin. The rotor freely revolves on shoulder 25. The rotor spins at a high speed, preferably 36,000–50,000 r.p.m., depending upon the size of the gas chamber and the particular use to which the gyroscope is put. The gyro gimbals, however, are locked in their orthogonal positions by the engagement of shoulder 25 of holding member 21 with bushing 27. When the gas pressure within chamber 15 falls to a predetermined level, preferably 75 to 150 lbs. per square inch, the metal diaphragm 19, which has been held against rubber compound 10 by the high gas pressure, springs to the position shown by line 19a in FIG. 3. This springing out of the diaphragm brings with it disc holder 21 and withdraws the shoulder 25 from cylinder 27. Retraction of the diaphragm uncages the tube 28 and its attached rotor 33 and frees the gyro gimbals to perform in accordance with the laws of gyro stability. The thin metal cover plate 51 is ruptured at 50 lbs. per square inch pressure to keep the pressure from building up inside chamber 29.

Figure 6:
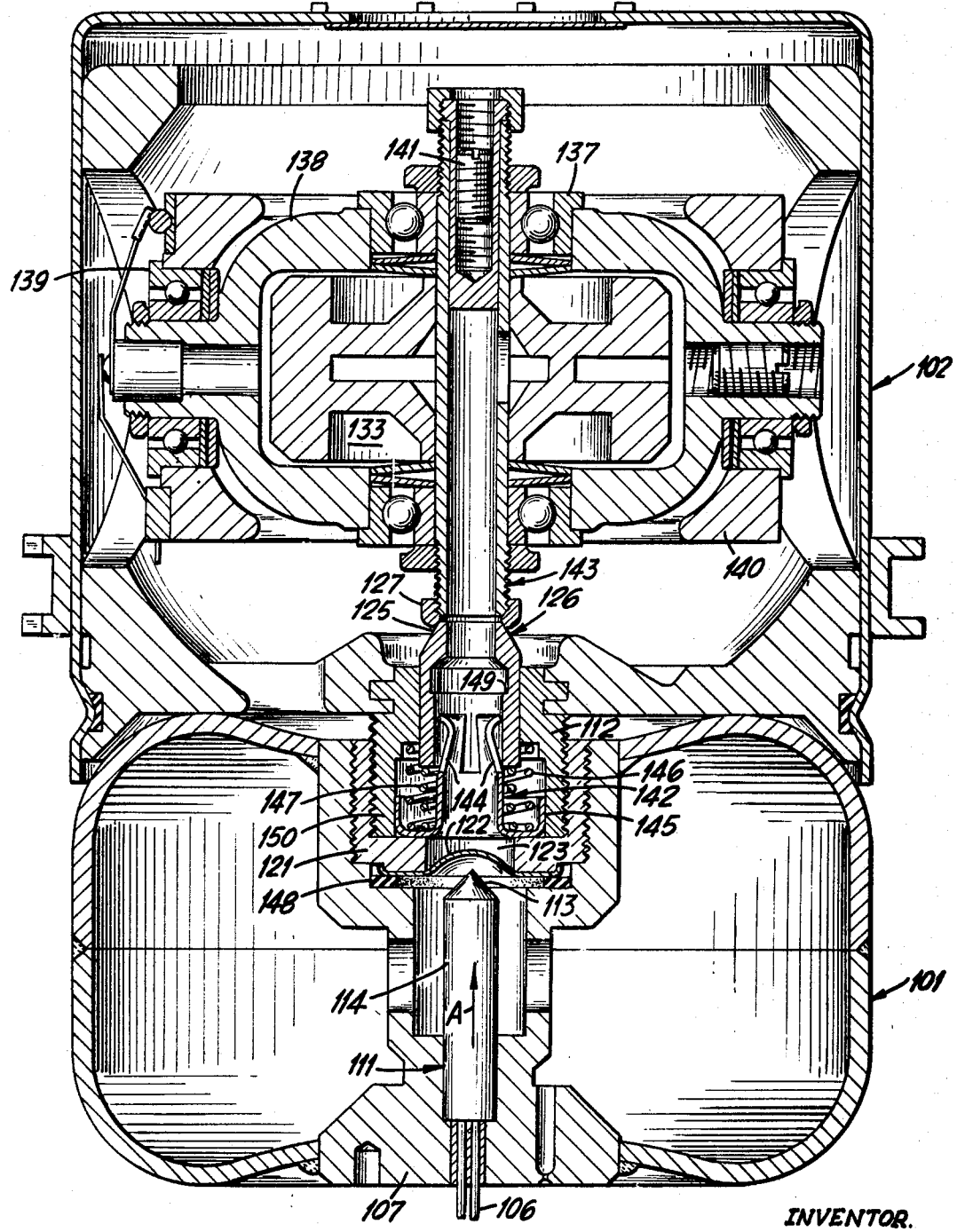
FIG. 6 is a sectional view similar to FIG. 3 but of a second embodiment of the present invention.

In the embodiment shown in FIG. 6, the gyroscope's main case member 102 has attached to it a front case member 101. The gyroscope in case member 102 has previously been described in detail in connection with the embodiment of FIGS. 1–5. The components of the gyroscope of FIG. 6 are the same in the embodiment shown in FIGS. 1–5. These components include the gyroscope rotor 133, rotor bearings 137, inner gimbal 138, inner gimbal bearings 139, outer gimbal 140, hollow center shaft 143, plug member 141, and a cylindrical bushing member 127 attached at the end of the shaft 143.

The front case member 101 is a closed container having gas under high pressure, of about 3,000 lbs. per square inch. A wire 106 leads through the sealing plug 107 which seals the front case member 101. The wire 106 terminates in a hollow piston 111 having a sharp point 113. The piston has within it pyrotechnic material 114 which is ignitable by the wire 106 to drive the piston 111 forward in the direction shown by arrow A. The high pressure gas within the chamber of front case member 101 is kept normally separated from the main case member 102 by means of a thin rupturable metal disc 122. Disc 122 is held up against a disc holder 121 by a rubber ring 148. Disk holder 121 has an opening 123 through which the gas passes upon the rupturing of the disc 122.

Figure 7:
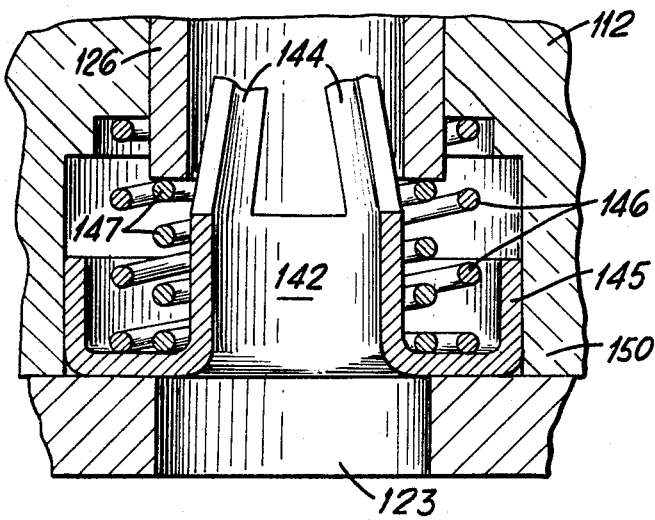
FIG. 7 is an enlarged sectional view of one portion of the device shown in FIG. 6.
Figure 8:
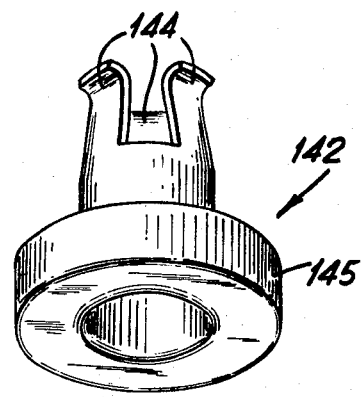
FIG. 8 is a perspective view of one of the parts used in the embodiment of FIG. 6.

A tubular caging plug 126 having a beveled shoulder portion 125 is positioned within a holding ring 112, see the enlarged scale drawing of FIG. 7. A spring clip 142 is positioned within the central cavity of plug 126. Spring clip 142, see FIG. 8, has three, or more, prongs 144. Spring clip 142 at its bottom has a channel 145 which is supported by the flange 150 on holding ring 112. The channel 145 forms the bottom support of an outer spring 146 and an inner spring 147. Springs 146 and 147 are under compression prior to initiation of the operation of the gyroscope. The outer spring 147 is compressed between the channel 145 and the bottom shoulder of the holding ring 112. The inner spring is compressed between the bottom shoulder of the bushing 126 and the channel 145. The coil spring pressure of spring 146 is considerably greater than that of the inner spring 147.

In operation, the wire 106 is electrically operated and ignites the pyrotechnic material 114 within piston 111. This ignition causes the piston 111 to move upward in the direction of arrow A and to pierce disc 122. The gas within front case member 101 rushes at great velocity through the opening 123 and through the interiors of spring clip 142 and caging plug 126 and into the hollow shaft 143. The exhaust of the gas from rotor 133 starts it in rapid rotation. However, the gimbal at this point in the operation is still held because of the contact between shoulder 125 of plug 126 and bushing 127 on the shaft 143. This contact has very little rotatable friction so that the shaft is free to rotate.

Figure 9:
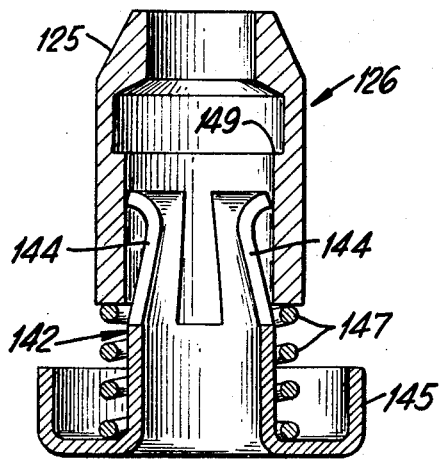
FIG. 9 is a sectional view of one portion of assembly shown in FIG. 6 prior to the release of the gas.
Figure 10:
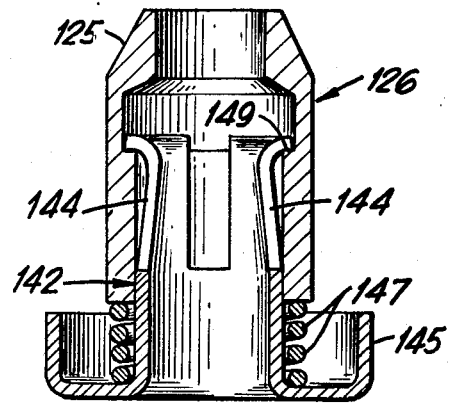
FIG. 10 is the same members as shown in FIG. 9 after the release of the gas.

When the disc is punctured, the great forward rush of the gas drives spring clip 142 upward from the position shown in FIG. 9 to that shown in FIG. 10. The prongs 144 of spring clip 142 are flexible so that they spring outward and catch on the small shoulder 149 of caging plug 126. The forward rush of the gas in the direction of arrow A maintains the spring clip 142 upward against the downward pressure of outer spring 146. The forward movement of spring 142 is limited by its channel portion 145 fully compressing spring 147.

When the forward rush of the gas decreases due to the equalization of gas pressure between the chambers of case members 101 and 102, the outer spring 146 forces the spring clip 142 downward in the direction opposite to arrow A. The caging plug 126 is carried backward along with the spring clip 142 due to its prongs 144 having caught on the shoulders 149.

The rearward movement of the caging plug 126 releases shoulders 125 and bushing 127 so that the shaft clears the plug 126 and the gimbal is free to move.

The prongs 144 may be released from shoulder 149 and the spring clip removed and replaced for re-use of the gyroscope.

The coil spring 146 is sufficiently powerful so that it causes the inward bowing and shortening of the prongs 144 of the spring member 142.

In the embodiment shown in FIGS. 11 and 12, the case 202 containing compressed gas is at a right angle to the main case 201 of the gyroscope. The gyroscope itself and its ignition device, including the rotor 133, rotor bearings 137, inner gimbal 138, outer gimbal 140, hollow center shaft 143, plug member 141, wire 106, sealing plug 107, piston 111, piston point 113, metal disc 122, disc holder 121, disc holder opening 123, and rubber ring 148 are the same as in the embodiments of FIG. 6.

A beveled portion 227 of the shaft 143 performs the same function as bushing 127 in the embodiment of FIG. 6.

A tube 261 leads from the opening 123 in the gas case 202 to the opening 262 in the gyroscope case 201. Tube 261 is on the outside of case 201 and has a curve 263.

A tubular caging plug 226, in its normal position, cages the gyroscope by having its exterior beveled shoulder portion 225 against the interior of the beveled portion 227 of the shaft 143. An integral flange 264 around the bottom of the caging plug 226 (at the end opposite the beveled portion 225) provides a platform for spring 265. Spring 265 is under compression when the gyroscope gimbal is caged and its release uncages the gimbal. A tubular spring member 267 is normally positioned so that its top supports shoulder 266 of caging plug 226 and holds the plug against the downward force of spring 265. The tubular spring member 267, of spring metal, has a plurality of integral bottom feet 268. There are openings between the feet 268 through which the gas may pass. The bottom of the feet 268 normally are within a circular groove 270 at the bottom of a piston 269. The bottom of the feet 268 are sufficiently broad so that part of them rest on the circumferential shoulder 271 of cylinder 272. The cylinder 272 is sufficiently large so that the piston 269 may slide within it. The cylinder 272 is fixed to the case member 201, and to the tube 261.

In operation, the wire 106 is electrically operated and ignites the pyrotechnic material within the piston 111. The disc 122 is pierced and a great forward rush of gas from case 202 occurs through the opening 123 and down the tube 261. The gas flows between the feet 268 and into the hollow shaft 143, causing the rotor 133 to spin. Simultaneously the gas forces piston 269 back into cylinder 272, spreading the bottom of the spring feet 268, but then allowing the feet to spring inwards sufficiently to clear the shoulder 271 on cylinder 272. The forward rush of the the gas on the interior of the tubular member 267 is sufficient to maintain it up against the bushing 226 and keep the spring 265 under compression. When the forward rush of the gas is over, due to a build-up of gas pressure within the case 201, the compression of the spring 265 overcomes the action of the gas on tube member 267. The spring 265 acts on the flange 264 and causes the bushing 226 and the tubing 267 to move rearward, that is, away from the shaft 143. This rearward motion takes shoulder member 225 away from the beveled portion 227 of the shaft 143 and releases the shaft so that the gimbal is free to move.

Alternatives may be made in the present invention within the scope of the subjoined claims. For example, a liquid or solid pyrotechnic material, such as hydrozene and oxygen, may be placed in chamber 15 and ignited in place of using compressed gas. Such pyrotechnic material is superior to the compressed gas in that the chamber need not be gas tight for the period the device is stored, but need only contain the gas when the material is ignited.

I claim:

1. In gyroscope having a gimbal assembly and a case, a gas reaction driven rotor, a first chamber in the case within which the rotor revolves, a second gas-tight chamber in the case;
    a thin rupturable wall between the first and the second chambers, a piston positioned adjacent the rupturable wall, means to propel the piston through the rupturable wall portion including pyrotechnic material and a wire connected to the material from outside the said case;
    a revolvable hollow shaft connected to the rotor to feed gas to the rotor, and a metal spring diaphragm responsive to gas pressure and removably connected to the shaft for caging the gyro;
    wherein the rotor is hollow and has at least one nozzle from its cavity to the first chamber; and
    wherein the shaft has at least one opening from its hollow portion to the rotor's cavity.

2. In a gyroscope having a gimbal assembly and a gas reaction driven rotor, a first portion forming a first chamber within which the rotor revolves, the first case portion having a cylindrical opening, a second case portion forming a gas-tight chamber;
    a thin rupturable wall between the first and the second chambers, a piston positioned adjacent the rupturable wall, means to propel the piston through the rupturable wall including pyrotechnic material and a wire connected to the material from outside the said case;
    a revolvable hollow shaft connected to the rotor and having a shoulder portion;
    a tubular bushing slidably positioned in the cylindrical opening of the first chamber, said bushing having a shoulder portion and removably caging the gimbal assembly by being positioned against the shoulder of the shaft, and a bushing spring at least partially within said bushing and having a bottom flange portion and an expandable leg portion;
    a first normally compressed spring positioned between the said flange and the case, a second normally compressed spring positioned between the said flange and the bushing;
    wherein the rotor is hollow and has at least one nozzle from its cavity to the first chamber and the shaft has at least one opening from its hollow portion to the rotor's cavity;
    whereby upon rupturing of the wall the gas within the second case portion passes through the bushing spring forcing it further into the bushing so that its leg portion expands and hooks onto the shoulder portion of the bushing.

3. In a gyroscope having a gimbal assembly and a case, a gas reaction driven rotor, a first case portion forming a first chamber within which the rotor revolves, the first case portion having a cylindrical opening, a second case portion forming a gas-tight chamber;
    a thin rupturable wall between the first and the second chambers, a piston positioned adjacent the rupturable wall, means to propel the piston through the rupturable wall portion including pyrotechnic material and a wire connected to the material from outside the said case;
    a revolvable hollow shaft connected to the rotor and having a shoulder portion;
    a tubular bushing slidably positioned in the cylindrical opening of the first chamber, said bushing having a bottom flange and a top flange and removably caging the gimbal assembly by being positioned against the shaft, a caging spring having a top portion normally supporting the top flange of the bushing and a foot portion having an edge forming a camming face, a normally compressed spring positioned between the bottom flange of the bushing and the case, a piston slidably supported by the case and having a groove with an internal camming face to support the foot portion of the caging spring;

wherein the rotor is hollow and has at least one nozzle from its cavity to the first chamber and wherein the shaft has at least one opening from its hollow portion to the rotor's cavity.

References Cited

UNITED STATES PATENTS

| | | | |
|---|---|---|---|
| 3,082,630 | 3/1963 | Peterson et al. | 74—5.12 |
| 3,192,777 | 7/1965 | Zatsky | 74—5.12 |
| 3,287,982 | 11/1966 | Hayner et al. | 74—5.12 |

CORNELIUS J. HUSAR, *Primary Examiner.*